United States Patent [19]

Hines et al.

[11] Patent Number: 4,877,411

[45] Date of Patent: Oct. 31, 1989

[54] METHOD FOR COLOR MOUNTING THE LEVEL OF FINISH APPLIED TO TEXTILE MATERIALS AND FOR COLOR CODING TEXTILE MATERIALS: AMINE-REDUCIBLE FUGITIVE TINTS

[75] Inventors: John B. Hines; Jeffery R. Harris, both of Spartanburg, S.C.

[73] Assignee: Milliken Research Corporation, Spartanburg, S.C.

[21] Appl. No.: 237,478

[22] Filed: Aug. 29, 1988

[51] Int. Cl.$^4$ ............................................. D06P 5/13
[52] U.S. Cl. ............................................. 8/403; 8/602; 8/604; 8/115.6; 8/924; 8/930
[58] Field of Search ............................................. 8/403

[56] References Cited

U.S. PATENT DOCUMENTS

| | | | |
|---|---|---|---|
| 3,157,633 | 11/1964 | Kuhn | 534/729 |
| 3,927,044 | 12/1975 | Foster | 260/394 |
| 4,102,644 | 7/1978 | Hauser et al. | 8/403 |
| 4,141,684 | 2/1979 | Kuhn | 8/403 |
| 4,144,028 | 3/1979 | Hauser et al. | 8/403 |
| 4,167,510 | 9/1979 | Brewdle | 8/403 |
| 4,400,320 | 8/1983 | Keller et al. | 8/403 |

Primary Examiner—A. Lionel Clingman
Attorney, Agent, or Firm—Terry T. Moyer; H. William Petry

[57] ABSTRACT

A method is provided for temporary coloration of textile materials which comprises applying to said textile materials an amine-reducible tint in an amount sufficient to provide coloration to said textile material, said tint being characterized by the formula:

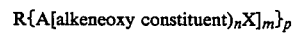

$$R\{A[\text{alkeneoxy constituent}]_n X]_m\}_p$$

where RA is the organic, easily reducible dyestuff radical, A is a linking moiety in said organic, easily reducible dyestuff radical selected from the group consisting of —N—, —O—, —S—, or —CO$_2$—, the alkenyl moiety of said alkyleneoxy constituent contains from 2 to about 4 carbon atoms, n is an integer of from 2 to about 300, m is 1 when A is —O—, —S—, —CO$_2$— and 2 when A is —N—, p is an integer of from 1 to 5, and X is a member of the group consisting of —H—, alkyl, -alkylcarboxylate, or -arylcarboxylate; and contacting said amine-reducible tint with an amine compound in an amount sufficient to reduce said tint whereby said coloration of said textile material is removed.

13 Claims, No Drawings

METHOD FOR COLOR MOUNTING THE LEVEL OF FINISH APPLIED TO TEXTILE MATERIALS AND FOR COLOR CODING TEXTILE MATERIALS: AMINE-REDUCIBLE FUGITIVE TINTS

The present invention relates to a method for monitoring the level of fiber finish on yarn and during fiber manufacturing by means of amine-reducible fugitive tints. The present invention also relates to a method for temporarily color-coding materials by means of amine-reducible fugitive tints. More particularly, the present invention relates to such methods which employ alkyleneoxy-substituted fugitive tints which are easily reduced by amines causing the destruction of the color including those cyanine and triarylmethanes which have a net positive charge which is delocalized throughout the chromophore. The reduction of the tint results in the disappearance of the color without the necessity of a washing or scouring step. In the case of fugitive tinting of nylon, the terminal amines on the fibers provide the means to degrade the color. In other applications in which there are no basic amines, the amine can be added to the tint before applying the tint.

Fugitive tints which have achieved wide acceptance in the textile industry include the polyethyleneoxy-substituted tints described in Kuhn, et al., U.S. Pat. No. 3,157,633 (incorporated by reference). These tints are normally applied to yarn such as nylon yarn before heat setting. Such tints are a combination of a dyestuff radical and one or more polyethyleneoxy groups. Dyestuff radicals disclosed in the Kuhn, et al. patent include nitroso, nitro, azo, diphenylmethane, triarylmethane, xanthene, acridene, methine, thiazole, indamine, azine, oxazine, and o-anthraquinone radicals. Preferably, such radicals may be attached to the polymeric constituents of the tint composition by an amino nitrogen.

Fugitive coloration of nylon in particular presents special problems since the tinted yarn, or fabric woven or knitted therefrom, may be subjected to a heat-setting treatment, usually with steam. This heat-setting treatment can at times fix a conventional tint more or less permanently in the fibers so that the yarns remain stained or colored and the conventional tint cannot be removed readily in later finish-scouring operations. Special and inconvenient reducing or oxidizing treatments to remove a conventional tint may therefore by required.

Also, the use of fugitive tints to monitor the level and evenness of fiber finish applied to, for instance, nylon yarn after it is spun has not been heretofore known or suggested. Indeed, fugitive tints have not been considered as likely candidates for these monitoring tasks because yarn manufacturers do not conventionally wash yarn after it is spun (at which time the tint would be removed), and they do not want to sell colored yarn. The present invention would permit yarn manufacturers to tint yarn during spinning or even during finish application and would furthermore significantly provide for color removal controllably after a desired length of time, say from as little as a half hour to as long as several weeks or more without the necessity of a separate washing step.

Also, with the advent of improved carpet dyeing techniques (such as the Kuster Dyer) scouring of the carpet with copious quantities of water is becoming unnecessary and, in fact, may be undesirable except for the necessity of removing the fugitive tint. The present invention would permit removal of the color provided by the tint without the necessity of a separate, and otherwise unnecessary washing step in such operations.

Furthermore, while the conventional fugitive tints have in the past generally been applied at levels below about 0.5% of tint based upon the weight of the fiber, at the present time increasing tint levels are being called for to maintain proper identification of yarn ends during tufting operations. When conventional fugitive tints are used at such higher levels, e.g., above about 0.5%, removal of all of the tint may become increasingly difficult or impossible. The present invention may permit color removal even when the tint must be applied at such higher levels.

Fugitive coloration of cellulosic fibers presents some difficult challenges, since conventional fugitive tints are not very fugitive on these fibers. According to the present invention, mixing an amine with the amine reducible tints immediately before application, the tint can then be applied to the cellulosic fiber or yarn, and the color will disappear after a certain, desired length of time say from as little as a half hour to as long as several weeks or more.

Accordingly, it would desirable to provide a method involving the use of fugitive tints that fade in the presence of basic amines which may be added separately or which may be present on the textile material to which the tint is applied without the necessity of extensive washing or scouring of the textile material. It would also be desirable to provide a process method to monitor the level and evenness of the application of fiber finish to textile materials especially yarn where the color provided by the tint used to monitor finish application will be removed over a desired length of time without a separate washing step. It would further be desirable to provide a method involving the use of a fugitive tint that may be used at the higher levels currently required in certain textile manufacturing operations.

It would furthermore be desirable to provide a method which employs polymeric tints having increased brightness for yarn end identification and to have a color removal mechanism based upon chemical reduction of the chromophore as an alternative to, or in addition to color removal by means of water scouring techniques.

The tints employed in the method of the present invention can generally serve a similar function to traditional tints or they can be used in an entirely new way, i.e., as a means to monitor the level and evenness of fiber finish application. They deviate from prior art fugitive tints in the method of color removal which is brought about by reduction of the chromophore upon contact with basic amines. Rather than depending upon current water scouring techniques for fugitivity, the color is destroyed without the necessity of applying any external process. Because the color is destroyed by reduction by amines, the polymeric substituent does not actually need to be removed from the fiber surface and water-scouring is not necessarily incorporated into the process. It is to be understood, however, that the polymeric substituent does allow for water scouring to be either the sole method of color fugitivity or to complement the chemical reduction mechanism. The polymeric substituent also allows the tint to be removed from the machinery, the skin and clothes of the yarn spinning workers, and from walls and floor of the plant by water washing.

Tints which lose color controllably after a desired length of time, say from as little as half hour to as long as several weeks or more, due to reduction by amines in general may have a net positive charge delocalized through the chromophore or be highly susceptible to reduction. They include certain triphenylmethane, cyanine, hemicyanine, azacyanine, and methine tints. These aforementioned chromophores, being dyestuff radicals, may be attached to polymeric alkyleneoxy groups by, for instance, an amino nitrogen.

Important amine-reducible tints employed in the process of the present invention are characterized by the general formula $R\{A\text{-}[\text{alkyleneoxy constituent})_n X]_m\}_p$ wherein RA is an organic, cationic or easily reduced dyestuff radical, A is a linking moiety in said organic, cationic or easily reduced dyestuff radical selected from the group consisting of —N—, —O—, —S—, or —CO$_2$—, the alkylene moiety of the alkyleneoxy constituent contains from 2 to about 4 carbons, n is an integer of from 2 to about 300, m is 1 when A is —O—, —S—, —CO$_2$— and 2 when A is —N—, p is an integer of from 1 to 5, and X is a member of the group consisting of —H, -alkyl, -alkylcarboxylate, or -arylcarboxylate.

Preferred among the compounds of the above formula are those where A, the linking moiety of the amine-reducible dyestuff radical, is an amino nitrogen. Compounds contemplated within this general class are those wherein the amine-reducible dyestuff radical is a triarylmethane, cyanine, hemicyanine, azacyanine, or methine dyestuff radical. Amine-reducible tints are disclosed which are useful for monitoring the level of fiber finish applied to textile materials and for temporary color coding of textile materials. The tints include those having the formula:

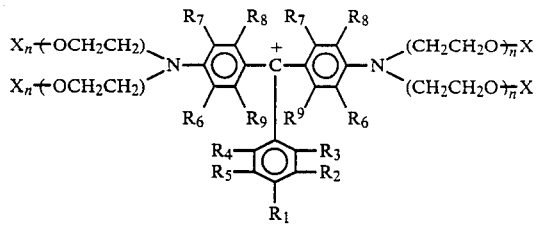

wherein $R_1$ is —Cl, —Br, —F, -alkoxy, —NO$_2$, —H, -alkyl, —N(alkyl)$_2$, —N[(alkyleneoxy)$_n$X]$_2$, -aryl, or —N(aryl)$_2$; $R_2$, $R_3$, $R_4$, $R_5$, $R_6$, $R_7$, $R_8$, and $R_9$ are —H, -alkyl, -alkoxy, —Cl, —Br, or —F; n is from 2 to about 300; and X is —H, -alkyl, -alkylcarboxylate, or -arylcarboxylate.

Also included among the amine-reducible tints are those having the formula:

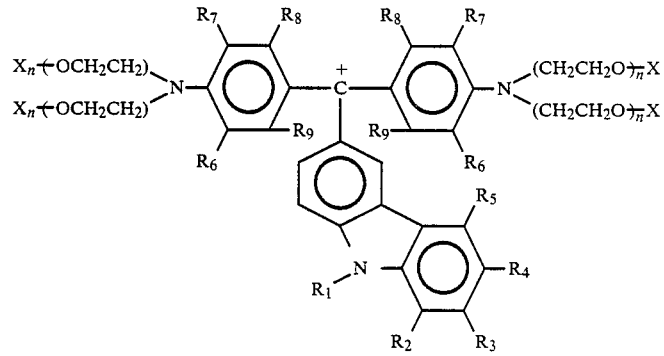

wherein $R_1$ is —H or -alkyl; $R_2$, $R_3$, $R_4$, $R_5$, $R_6$, $R_7$, $R_8$, and $R_9$ are —H, -alkyl, -alkoxy, —Cl, —Br, or —F; n is from 2 to about 300; and X is —H, -alkyl, -alkylcarboxylate, or -arylcarboxylate.

Also included among amine-reducible tints are those having the formula:

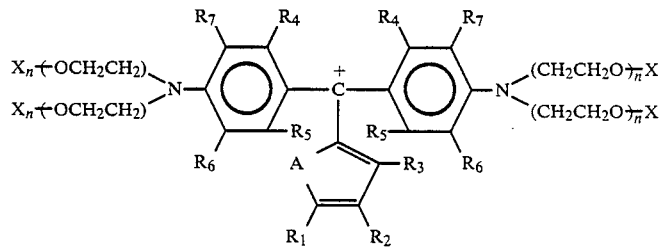

wherein $R_1$, $R_2$, $R_3$, $R_4$, $R_5$, $R_6$, and $R_7$ are —H, -alkyl, -alkoxy, —Cl, —Br, or —F; n is from 2 to about 300; A is —O—, —NH—, or —S—; and X is —H, -alkyl, -alkylcarboxylate, or -arylcarboxylate.

Also included among amine-reducible tints are those having the formula:

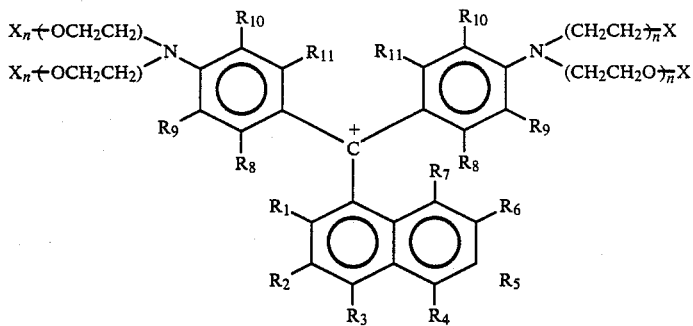

wherein $R_1$, $R_2$, $R_3$, $R_4$, $R_5$, $R_6$, $R_7$, $R_8$, $R_9$, $R_{10}$, and $R_{11}$ are —H, -alkyl, -aryl, -alkoxy, —$NO_2$, —CN, —Br, —Cl, —F, —$N(alkyl)_2$, —$NH_2$, -acyl, and —$SO_2Z$ where Z is -alkyl, -aryl, —OH, or —O-metal; n is from 2 to about 300; and X is —H, -alkyl, -alkylcarboxylate, or -arylcarboxylate.

Also included among said amine-reducible tints are those having the formula:

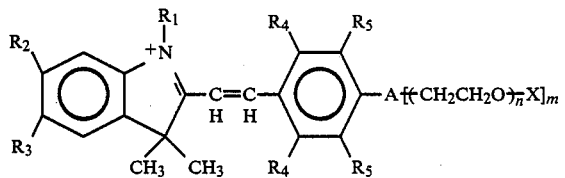

wherein $R_1$ is -alkyl, $R_2$ and $R_3$ are —H, —$NO_2$, —CN, —Cl, —Br, -alkyl, or -alkoxy; $R_4$ and $R_5$ are —H, -alkyl, -alkoxy, —Cl, —Br, or —F; n is from 2 to about 300; A is —O—, —S—, or —N—; when A is —O— or —S— then m is 1; when A is —N— then m is 2; X is —H, -alkyl, -alkylcarboxylate, or -arylcarboxylate.

Also included among amine-reducible tints are those having the formula:

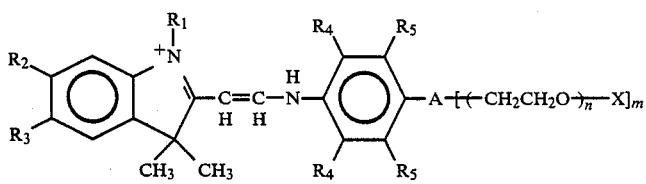

wherein $R_1$ is -alkyl, $R_2$ and $R_3$ are —H, —$NO_2$, —CN, —Cl, —Br, -alkyl, or -alkoxy; $R_4$ and $R_5$ are —H, -alkyl, -alkoxy, —Cl, —Br, or —F; n is from 2 to about 300; A is —O—, —S—, —N—; when A is —O— or —S— then m is 1; when A is —N— then m is 2; X is —H, -alkyl, -alkylcarboxylate, or -arylcarboxylate.

Also included among amine-reducible tints are those having the formula:

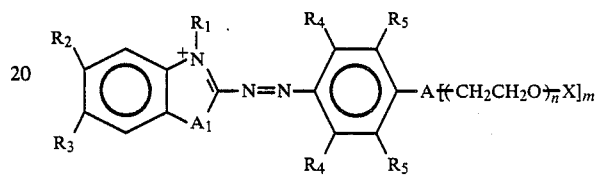

wherein $R_1$ is -alkylchlorohydrin, -alkylamide, -alkylcarboxylate, -allyl, or -alkyl; $R_2$ and $R_3$ are —H, —$NO_2$, —CN, —Cl, —Br, -alkylsulphonyl, acetamidyl, sulphonamidyl, —$SO_3Z$ where Z is H or metal ion, -alkyl, or -alkoxy; $R_4$ and $R_5$ are —H, -alkyl, -alkoxy, —Cl, —Br, or —F; n is from 2 to about 300; A is —O—, —S—, or —N—; when A is —O— or —S— then m is 1; when A is —N— then m is 2; X is —H, -alkyl, -alkylcarboxylate or -arylcarboxylate; and $A_1$ is —O—, —S— or —NH—.

Also included among said amine-reducible tints are those having the formula:

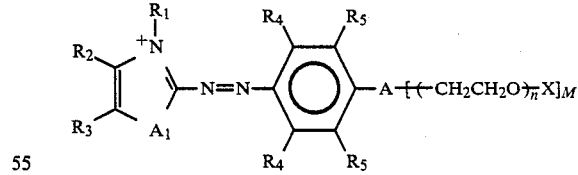

wherein $R_1$ is -alkylchlorohydrin, -alkylamide, -alkylcarboxylate, -allyl, or -alkyl; $R_2$ and $R_3$ are —H, -alkyl, —CN-alkylsulphonyl, acetamidyl, sulphonamidyl, —$SO_3Z$ where Z is —H or metal ion or -aryl; $R_4$ and $R_5$ are —H, -alkyl, -alkoxy, —Cl, —Br, —F, —CN or —$NO_2$; n is from 2 to about 300; A is —O—S, —S—, or —N—; when A is —O— or —S— then m is 1; when A is —N— then m is 2; X is —H, -alkyl, alkylcarboxylate, or -arylcarboxylate; and $A_1$ is —O—, —S—, or —NH—.

Also included among the amine-reducible tints are those having the formula:

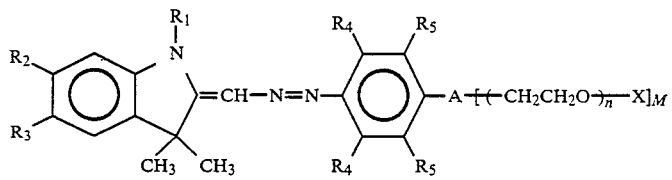

wherein $R_1$ is -alkyl; $R_2$ and $R_3$ are —H, —NO$_2$, —CN, —Cl, —Br, -alkyl, or -alkoxy, $R_4$ and $R_5$ are —H, -alkyl, -alkoxy, —Cl, —Br, or —F; n is from 2 to about 300; A is —O—, —S—, or —N—; when A is —O— or —S— then m is 1; when A is —N— then m is 2; X is —H, -alkyl, -alkylcarboxylate, or -arylcarboxylate.

Also included among the amine-reducible tints are those having the formula:

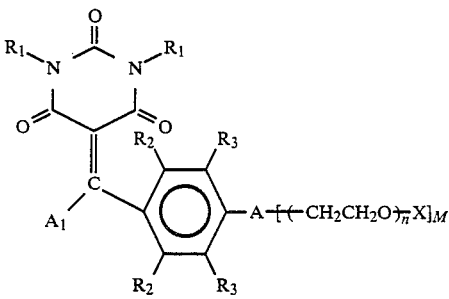

wherein $R_1$ is -alkyl; $R_2$ and $R_3$ are —H, -alkyl, -alkoxy, —Cl, —Br, or —F; n is from 2 to about 300; A is —O—, —S—, or —N—; when A is —O— or —S— then m is 1; when A is —N— then m is 2; X is —H, -alkyl, -alkylcarboxylate, or -arylcarboxylate; $A_1$ is —H or -alkyl.

Suitable amines for reducing the tint and fading the color include the terminal amines on nylon fiber, or basic, water soluble, nonvolatile amines which can be added to the tint immediately before application. Polyethylene imines and Jeffamines (amine-terminated polyethylene glycols manufactured by Texaco), are preferred amines for this application. Other amines which have been shown to work in this system include: n-propylamine, tetramethylguanidine, ethylene diamine, triacetone diamine, tetramethylpiperidinol, 2-amino-1-butanol, morpholine, 2-amino-2-methylpropanol, and tetraethylene pentamine. Protected amines such as the reaction products of aromatic aldehydes with any of the previously mentioned amines are also preferred. These protected amines regenerate basic amines when they are sufficiently heated or when they are exposed to acid. The amount of amine compound employed may be at least about one equivalent.

The present invention may be further understood by reference to the following examples which are not to be construed as limiting the scope of the subject matter of the invention in any way. Unless otherwise indicated all parts or percentages are by weight. In addition the value n, unless otherwise indicated, has an average numerical value of 100.

EXAMPLE 1

Synthesis of N,N-bis(hydroxyethylpolyoxyethylene)aniline (I)

One hundred eighty-three grams of N,N-bis(hydroxyethyl)aniline are allowed to react with 4400 grams ethylene oxide in the presence of potassium hydroxide following well known ethoxylation procedures. About 100 molar equivalents of ethylene oxide are thus added to the starting material.

EXAMPLE 2

Synthesis of Methylium sulfate, bis[4-(N,N-bis[hydroxyethylpolyoxyethylene]aminophenyl)]-4-(N,N-dimethylamino)phenyl Tint (II)

The synthesis of (II) is carried out by heating 4493 grams (I), 74.5 grams 4-N,N-dimethylaminobenzaldehyde, and 21 grams urea until all the starting material has melted, about 70° C. 33 grams concentrated H$_2$SO$_4$ are added, and the reaction is heated and held at 90° C. for three hours. The product is then oxidized by traditional methods. The dark violet colored solution of (II) is then cut to the proper absorptivity and bottled.

EXAMPLE 3

Synthesis of Methylium sulfate, bis[4-(N,N-bis[hydroxyethylpolyoxyethylene]aminophenyl)]-4-chlorophenyl Tint (III)

The synthesis of (III) is carried out by heating 4493 grams (I), 70.2 grams 4-chlorobenzaldehyde, and 21 grams urea until all the starting material has melted, about 70° C. 33 grams concentrated H$_2$SO$_4$ are added, and the reaction is heated and held at 90° C. for three hours. The product is then oxidized by traditional methods. The dark green colored solution of (III) is then cut to the proper absorptivity and bottled.

EXAMPLE 4

Synthesis of Methylium sulfate, bis[4-(N,N-bis[hydroxyethylpolyoxyethylene]aminophenyl)]-4-methoxyphenyl Tint (IV)

The synthesis of (IV) is carried out by heating 4493 grams (I), 68 grams 4-methoxybenzaldehyde, and 21 grams urea until all the starting material has melted, about 70° C. 33 grams concentrated H$_2$SO$_4$ are added, and the reaction is heated and held at 90° C. for three hours. The product is then oxidized by traditional methods. The dark green colored solution of (IV) is then cut to the proper absorptivity and bottled.

EXAMPLE 5

Synthesis of Bis-1,4-methylium sulfate, bis[4-(N,N-bis[hydroxyethylpolyoxyethylene]aminophenyl)]-phenyl Tint (V)

The synthesis of (V) is carried out by heating 4493 grams (I), 42.5 grams terephthaldicarboxaldehyde, and 21 grams urea until all the starting material has melted, about 70° C. 33 grams concentrated H$_2$SO$_4$ are added, and the reaction is heated and held at 90° C. for three hours. The product is then oxidized by traditional methods. The dark green colored solution of (V) is then cut to the proper absorptivity and bottled.

EXAMPLE 6

Synthesis of Methylium sulfate, bis[4-(N,N-bis[hydroxyethylpolyoxyethylene]aminophenyl)]-3-nitrophenyl Tint (VI)

The synthesis of (VI) is carried out by heating 4493 grams (I), 75.5 grams 3-nitrobenzaldehyde, and 21 grams urea until all the starting material has melted, about 70° C. 33 grams concentrated $H_2SO_4$ are added, and the reaction is heated and held at 90° C. for three hours. The product is then oxidized by traditional methods. The dark green colored solution of (VI) is then cut to the proper absorptivity and bottled.

EXAMPLE 7

Synthesis of Methylium sulfate, bis[4-(N,N-bis[hydroxyethylpolyoxyethylene]aminophenyl)]-phenyl Tint (VII)

The synthesis of (VII) is carried out by heating 4493 grams (I), 53 grams benzaldehyde, and 21 grams urea until all the starting material has melted, about 70° C. 33 grams concentrated $H_2SO_4$ are added, and the reaction is heated and held at 90° C. for three hours. The product is then oxidized by traditional methods. The dark green colored solution of (VII) is then cut to the proper absorptivity and bottled.

EXAMPLE 8

Synthesis of Methylium sulfate, bis[4-(N,N-bis[hydroxyethylpolyoxyethylene]aminophenyl)]-3-(N-ethylcarbazolyl) Tint (VIII)

The synthesis of (VIII) is carried out by heating 4493 grams (I), 111.7 grams 9-ethyl-3-carbazolecarboxaldehyde, and 21 grams urea until all the starting material has melted, about 70° C. 33 grams concentrated $H_2SO_4$ are added, and the reaction is heated and held at 90° C. for three hours. The product is then oxidized by traditional methods. The dark blue colored solution of (VIII) is then cut to the proper absorptivity and bottled.

EXAMPLE 9

Synthesis of Methylium sulfate, bis[4-(N,N-bis[hydroxyethylpolyoxyethylene]aminophenyl)]-4-(N,N-diphenylamino)phenyl Tint (IX)

The synthesis of (IX) is carried out by heating 4493 grams (I), 136.7 grams triphenylamine-4-carboxaldehyde, and 21 grams urea until all the starting material has melted, about 70° C. 33 grams concentrated $H_2SO_4$ are added, and the reaction is heated and held at 90° C. for three hours. The product is then oxidized by traditional methods. The dark violet colored solution of (IX) is then cut to the proper absorptivity and bottled.

EXAMPLE 10

Synthesis of Methylium sulfate, bis[4-(N,N-bis[hydroxyethylpolyoxethyleneaminophenyl)]-2-naphthyl Tint (X)

The synthesis of (X) is carried out by heating 4493 grams (I), 78 grams 1-naphthaldehyde, and 21 grams urea until all the starting material has melted, about 70° C. 33 grams concentrated $H_2SO_4$ are added, and the reaction is heated and held at 90° C. for three hours. The product is then oxidized by traditional methods. The dark green colored solution of (X) is then cut to the proper absorptivity and bottled.

EXAMPLE 11

Synthesis of Methylium sulfate, bis[4-(N,N-bis[hydroxyethylpolyoxyethylene]aminophenyl)]-4-methylphenyl Tint (XI)

The synthesis of (XI) is carried out by heating 4493 grams (I), 60.5 grams 4-tolualdehyde, and 21 grams urea until all the starting material has melted, about 70° C. 33 grams concentrated $H_2SO_4$ are added, and the reaction is heated and held at 90° C. for three hours. The product is then oxidized by traditional methods. The dark green colored solution of (XI) is then cut to the proper absorptivity and bottled.

EXAMPLE 12

Synthesis of Methylium sulfate, bis[4-(N,N-bis[hydroxyethylpolyoxyethylene]aminophenyl)]-2-furfuryl Tint (XII)

The synthesis of (XII) is carried out by heating 4493 grams (I), 48 grams 2-furaldehyde, and 21 grams urea until all the starting material has melted, about 70° C. 33 grams concentrated $H_2SO_4$ are added, and the reaction is heated and held at 90° C. for three hours. The product is then oxidized by traditional methods. The dark green colored solution of (XII) is then cut to the proper absorptivity and bottled.

EXAMPLE 13

Synthesis of Methylium sulfate, bis[4-(N,N-bis[hydroxyethylpolyoxyethylene]aminophenyl)]-2-thiophenyl Tint (XIII)

The synthesis of (XIII) is carried out by heating 4493 grams (I), 66.1 grams 2-thiophene carboxaldehyde, and 21 grams urea until all the starting material has melted, about 70° C. 33 grams concentrated $H_2SO_4$ are added, and the reaction is heated and held at 90° C. for three hours. The product is then oxidized by traditional methods. The dark green colored solution of (XIII) is then cut to the proper absorptivity and bottled.

EXAMPLE 14

Synthesis of Methylium sulfate, bis[4-(N,N-bis[hydroxyethylpolyoxyethylene]aminophenyl)]-3-carbazolyl Tint (XIV)

The synthesis of (XIV) is carried out by heating 4493 grams (I), 97.7 grams 3-formylcarbazole, and 21 grams urea until all the starting material has melted, about 70° C. 33 grams concentrated $H_2SO_4$ are added, and the reaction is heated and held at 90° C. for three hours. The product is then oxidized by traditional methods. The dark blue colored solution of (XIV) is then cut to the proper absorptivity and bottled.

EXAMPLE 15

Synthesis of Methylium sulfate, Tris[4-(N,N-bis[hydroxyethylpolyoxyethylene]aminophenyl)] Tint (XI)

The synthesis of (XI) is carried out by heating 4493 grams (I), 2260.5 grams 4-formylaniline substituted with 100 moles of ethylene oxide, and 21 grams urea until all the starting material has melted, about 70° C. 33 grams concentrated $H_2SO_4$ are added, and the reaction is heated and held at 90° C. for three hours. The product is then oxidized by traditional methods. The dark violet colored solution of (XV) is then cut to the proper absorptivity and bottled.

EXAMPLE 16

Synthesis of Methylium sulfate, bis[4-(N,N-bis[hydroxyethylpolyoxyethylene]aminophenyl)]-3,4-methylenedioxyphenyl Tint (XVI)

The synthesis of (XVI) is carried out by heating 4493 grams (I), 75 grams piperonal, and 21 grams urea until all the starting material has melted, about 70° C. 33 grams concentrated $H_2SO_4$ are added, and the reaction is heated and held at 90° C. for three hours. The product is then oxidized by traditional methods. The dark bluish green colored solution (XVI) is then cut to the proper absorptivity and bottled.

EXAMPLE 17

Synthesis of Methylium sulfate, bis[4-(N,N-bis[hydroxyethylpolyoxyethylene]aminopheny)]-5-bromo-2-methoxyphenyl Tint (XVII)

The synthesis of (XVII) is carried out by heating 4493 grams (I), 107.5 grams 5-bromo-2-anisaldehyde, and 21 grams urea until all the starting material has melted, about 70° C. 33 grams concentrated $H_2SO_4$ are added, and the reaction is heated and held at 90° C. for three hours. The product is then oxidized by traditional methods. The dark green colored solution (XVII) is then cut to the proper absorptivity and bottled.

EXAMPLE 18

Synthesis of an Ethoxylated Hemicyanine Tint (XVIII)

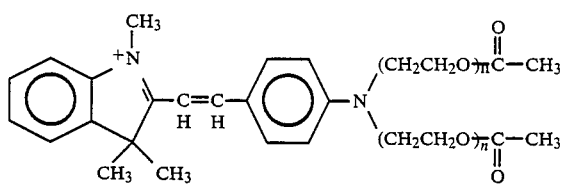

(XVIII)

Fisher's base (4.96 g) is condensed with para-formyl-N,N-polyoxyethylene aniline diacetate (162 g, as prepared in U.S. Pat. No. 4,596,454 with a degree of polymerization of 100) for two hours at 85° C. using acetic acid (20.7 g) was catalyst. The reaction is held on temperature for two hours. The red product, (XVIII), is cut to the proper absorptivity and bottled.

EXAMPLE 19

Synthesis of an Ethoxylated Azacarbocyanine Tint (XIX)

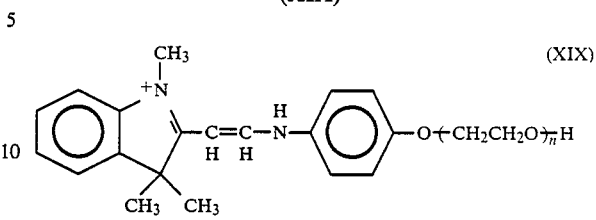

(XIX)

Para-amino(polyoxyethylenephenol) (150 g) is condensed with Fisher's Aldehyde (10.5 g) for three hours at 85° C. The yellow product, (XIX), is cut to the proper absorptivity and bottled.

EXAMPLE 20

Synthesis of an Ethoxylated Azacyanine Tint (XX)

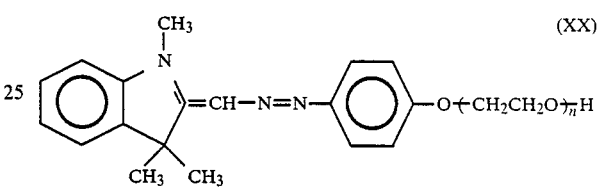

(XX)

Para-amino(polyoxyethylenephenol) (285 g), as prepared in U.S. Pat. Case No. 1641, is charged to a flask which was cooled to −5° C. Concentrated HCl (31.7 g) is slowly added to the flask. Sodium Nitrite (7.6 g) is then slowly added to the reaction mixture while carefully maintaining the temperature below 5° C. causing the formation of a diazonium salt. After agitating for two hours, Fisher's Base is added to the reaction flask and allowed to couple with diazonium salt for two hours with cooling. The reaction is allowed to reach room temperature and held there for four hours. The yellow product, (XX) is cut to the proper absorptivity and bottled.

EXAMPLE 21

Synthesis of an Ethoxylated Diazahemicyanine Tint (XXI)

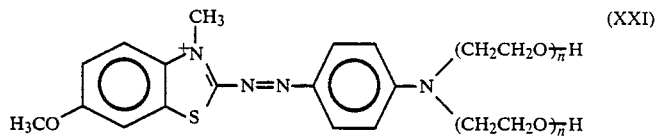

(XXI)

Nitrosylsulfuric Acid (33.5 g) is added to a flask which is cooled to below 5° C. Eighteen grams of 2-amino-6-methoxybenzothiazole is added slowly, keeping the temperature below 5° C. Two grams of concentrated sulfuric acid is also added to decrease the viscosity of the mixture, which will subsequently be referred to as the diazo product. After allowing the mixture to agitate for three hours, 427 g of I is dissolved in 235 g of water and placed in a different reactor which is then cooled to −5° C. The diazo product is then added over a 30 minute period. The reaction mixture is then held for two hours at 5° C. The pH is adjusted to pH 7 with 50% caustic, and the water is removed by vacuum stripping. Dimethyl sulfate (33.2 g) is added to the reaction, and the temperature is raised to 95° C. for one hour. Excess dimethyl sulfate is quenched and the pH is adjusted to 8 with ammonium hydroxide solution. The dark blue product (XXI), is cut to the proper absorptivity and bottled.

EXAMPLE 22

Synthesis of an Ethoxylated Diazahemicyanine Tint (XXII)

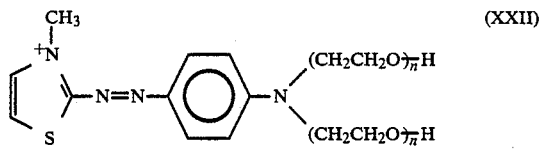

Nitrosylsulfuric acid (33.3 g) is added to a flask which is cooled to below 5° C. While maintaining the temperature, ten grams of 2-aminothiazole is added slowly. The viscosity is then reduced by adding two grams of concentrated sulfuric acid. After allowing the reaction to agitate for three hours, another flask has 412 g I dissolved in 235 g water charged to it. This second flask is cooled to −5° C., and the product from the first flask is charged to it over a 30 minute period. The reaction is maintained at 5° C. for two hours. The pH is adjusted to 7 with 50% caustic, and the water is removed by vacuum stripping. Dimethyl sulfate (33.2 g) is added slowly, and the temperature is raised to 90° C. for one hour. Excess dimethyl sulfate is quenched and the pH is adjusted to 8 with ammonium hydroxide solution. The dark blue product (XXII), is cut to the proper absorptivity and bottled.

EXAMPLE 23

Synthesis of 2-(2-(4-bis(polyoxyethylene acetate)amino)phenyl)ethenyl)-1,3-dimethylbarbituric Acid (XXIII)

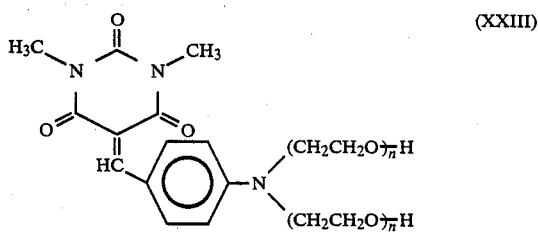

Dimethylbarbituric acid (15.2 g) is condensed with para-formyl-N,N-polyoxyethylene anilinediacetate (117 g), as prepared in U.S. Pat. No. 4,594,454 with a degree of polymerization of 20, for three hours at 85° C. using morpholine (1 g) as a catalyst. The yellow product, (XXIII), is cut to the proper absorptivity and bottled.

EXAMPLES 24–29

Application of Amine-Reducible Tints to Bulk Continuous Filament Nylon Fibers and Comparison With Conventional, Fugitive Tints Products Solutions of amine-reducible tints and control tints were sprayed on BCF Nylon filament through a siphon spray nozzle rated for 0.07 gallons per hour at 20 PSI. The spray nozzle was located 6 inches above the nylon filament in a so-called "dog-house" tint applicator. The yarn was pulled through the tint house by a take-up device rotating at a speed of 200 RPM. Tinted filament samples were then allowed to dry for 24 hours in the dark as well as in the laboratory under fluorescent light.

Example 24 provides a comparison of red tints. The amine-reducible tint employed was red hemicyanine tint (XVIII). The comparison was to Versatint Red II available from Milliken Chemical which is a polyalkyleneoxy-substituted diazo tint prepared as described in Example 6 of U.S. Pat. No. 4,400,320.

Example 25 provides a comparison of yellow tints. The amine-reducible tint employed was azacarbocyanine (XIX) and the comparison tint was Versatint Yellow II available from Milliken Chemical which is a polyalkyleneoxy-substituted diazo tint.

In Example 26 the amine-reducible tint employed was yellow cyanine tint (XX) and this tint again was compared to Versatint Yellow II.

In Example 27 a comparison of blue tints was provided. The amine-reducible tint employed was diazahemicyanine tint (XXI) and the comparison tint was Versatint Blue II available from Milliken Chemical which is a polyalkyleneoxy-substituted thiophene tint.

In each instance the amine-reducible tint was diluted with water to make a solution having an absorptivity of 0.6 and this solution was further diluted on a weight basis using 30 parts water and 1 part of the 0.6 absorptivity tint solution.

The samples of BCF Nylon tinted with the amine-reducible tint compounds employed in the process of the present invention faded to the original white of the fiber regardless of whether they were dried in the dark or under laboratory fluorescent light. The samples tinted with the conventional fugitive tint products maintained essentially the same color intensity whether stored in the light or in the dark.

EXAMPLE 30

Industrial Trial Application of Tints to BCF Nylon

Compounds (IV), (XVIII), and (XVIII) were tested at a BCF nylon yarn spinning plant. The tints were added to a proprietary spin finish and metered onto the filament immediately after the extrusion and cooling process. The finish formulation typically contained 15 pounds of tint for every 100 pounds of finish. The finish application equipment was calibrated to deliver enough finish so that the fiber picked up 0.15% tint by weight of the fiber.

With the addition of tint in the fiber finish, it was easy to see the application of the tinted finish onto the filament. The variation in the depth of color of the tinted fiber indicated whether the finish was being applied evenly or at the proper level. In these trials, it was noted that several of the finish applicators were not delivering the finish evenly or at the proper level. The results of the trial were verified by extraction and measurement of the finish levels.

The tinted finish provided another quality control measure. Occasionally the nylon filament will jump out of the finish application guides causing the filament not to pick up any more finish. When tinted finish is being used, the filament going on to collection cones will turn from the color of the tint to white. This problem occurred during the trials of the nylon reducible tints. and it was immediately spotted and corrected. Without tints, this problem might not have been noticed until much later, causing a large amount of inferior quality yarn to be produced.

Nylon tinted with (IV) faded from green to white in about 5 minutes. Nylon tinted with (XXIII) faded from a strong yellow to a very faint pink in 2-3 hours. Nylon tinted with (XVIII) faded from a strong red to pink in about 2-3 hours. After 12 hours, it had completely faded from the outside of the yarn package. By cutting the package open in different places, it was possible to see that the tint faded completely to white in the interior of the yarn package within 1-3 weeks. Some yarn, that had been tinted with (XVIII) and allowed to fade to white, was sent to be dyed. The tint had no apparent adverse effects on dyeing.

EXAMPLE 31

Effects on Different Amines on the Amine-Reducible Tints

Compound XVIII was formulated with different amines to see which amines caused the color to disappear at room temperature, which amines caused the color to disappear upon heating, and which ones caused no change in the color. In each case, 0.5 g of a 1.0 absorption solution of compound XVIII was formulated with 0.5 g of the amine being tested, and 50 ml water. The following table was constructed:

TABLE

| No. | Amine Additive | Time Heated | Color Change |
|---|---|---|---|
| 1. | None | 3 days | None |
| 2. | Jeffamine 1000* | 1 day | Color became lighter |
| 3. | n-propylamine | None | Color disappeared in one day |
| 4. | tetramethylguanidine | None | Color disappeared in two days |
| 5. | ethylene diamine | None | Color disappeared in one hour |
| 6. | triacetone diamine | None | Color disappeared in one day |
| 7. | 2,2,6,6-tetramethyl-piperidinol | None | Color disappeared in three days |
| 8. | 2-amino-1-butanol | None | Color disappeared in three days |
| 9. | morpholine | None | Color disappeared in three days |
| 10 | 2-amino-2-methyl-propanol | None | Color disappeared in three days |
| 11. | triethanolamine | 1 day | None |
| 12. | methenamine | 1 day | None |

*(an amine terminated polyethyleneglycol purchased from Texaco)

The results indicate that only basic amines destroy the color of the solution containing compound XVIII. The more basic the amine then the faster the rate of color disappearance.

EXAMPLE 32

Application of Tint to Fibers Other Than Nylon

The amine reducible tints were tested on cotton, polyester, and acrylic fibers. A solution of 10% tetraethylene pentamine in water was made, and mixed 50:50 with a solution of XVIII with an absorptivity of 1.0. The resulting solution was carded on to each of the three fiber types. The amount of amine and tint solution added to the fiber was 1% by weight of the fiber. Control samples were also made in which the solution of XVIII was carded on to the samples without adding the tetraethylene pentamine. The amount of the tint on the controls was 0.5% by weight of the fiber. All of the samples were stored in the dark. The tints that were mixed with tetraethylene pentamine faded considerably within one day after being applied to the fiber and completely within three days, but none of the control samples faded within three days.

What is claimed is:

1. A method for temporary coloration of textile materials, which comprises applying to said textile material, an amine-reducible tint in an amount sufficient to provide coloration to said textile material, said tint being characterized by the formula:

wherein RA is the organic, amine-reducible dyestuff radical selected from triarylmethane, cyanine, hemicyanine, azacyanine or methine dyestuff radicals, A is a linking moiety in said organic, easily reduced dyestuff radical selected from the group consisting of —N—, —O—, —S—, or —$CO_2$—, the alkylene moiety of said alkyleneoxy constituent contains from 2 to about 4 carbon atoms, n is an integer of from 2 to about 300, m is 1 when A is —O—, —S—, —$CO_2$— and 2 when A is —N—, p is an integer of from 1 to 5, and X is a member of the group consisting of —H—, -alkyl, -alkylcarboxylate, or -arylcarboxylate; and contacting said amine-reducible tint with an amine compound in an amount sufficient to reduce said tint whereby said coloration of said textile material is removed.

2. The method of claim 1 wherein said amine compound is selected from polyethylene imine, amine terminated polyethylene glycols, n-propyl amine, tetramethylguanidine, ethylene diamine, triacetone diamine, tetramethylpiperidinol, 2-amino-1-butanol, morpholine, 2-amino-2-methylpropanol, and tetraethylene pentamine.

3. The method of claim 1, wherein said amine compound is nylon.

4. The method of claim 1 wherein said amine-reducible tint is selected from compounds of the formula:

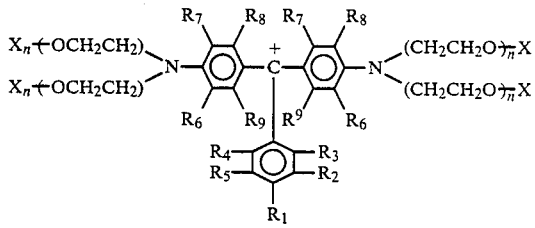

wherein $R_1$ is —Cl, —Br, —F, -alkoxy, —$NO_2$, —H, -alkyl, —N(alkyl)$_2$, —N[(alkyleneoxy)$_n$X]$_2$, -aryl, or —N(aryl)$_2$; $R_2$, $R_3$, $R_4$, $R_5$, $R_6$, $R_7$, $R_8$, and $R_9$ are —H, -alkyl, -alkoxy, —Cl, —Br, or —F; n is from 2 to about 300; and X is —H, -alkyl, -alkylcarboxylate, or -arylcarboxylate.

5. The method of claim 1 wherein said amine-reducible tint is selected from compounds of the formula:

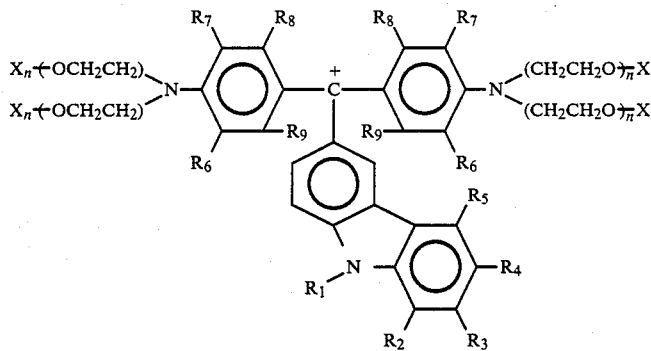

wherein $R_1$ is —H or -alkyl; $R_2$, $R_3$, $R_4$, $R_5$, $R_6$, $R_7$, $R_8$, and $R_9$ are —H, -alkyl, -alkoxy, —Cl, —Br, or —F; n is from 2 to about 300; and X is —H, -alkyl, -alkylcarboxylate, or -arylcarboxylate.

6. The method of claim 1 wherein said amine-reducible tint is selected from compounds of the formula:

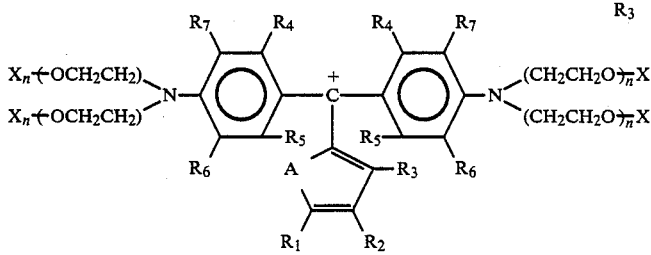

wherein $R_1$, $R_2$, $R_3$, $R_4$, $R_5$, $R_6$, and $R_7$ are —H, -alkyl, -alkoxy, —Cl, —Br, or —F; n is from 2 to about 300; A is —O—, —NH—, or —S—; and X is —H, -alkyl, -alkylcarboxylate, or -arylcarboxylate.

7. The method of claim 2 wherein said amine-reducible tint is selected from compounds of the formula:

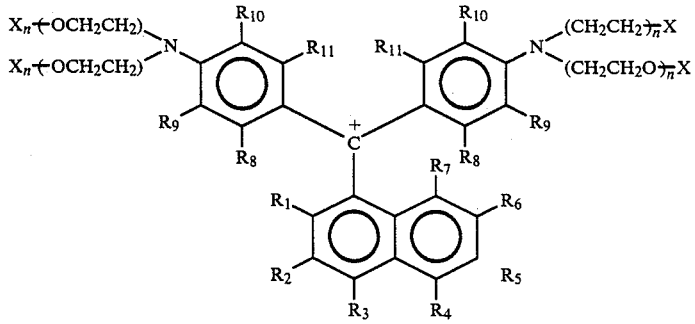

wherein $R_1$, $R_2$, $R_3$, $R_4$, $R_5$, $R_6$, $R_7$, $R_8$, $R_9$, $R_{10}$, and $R_{11}$ are —H, -alkyl, -aryl, -alkoxy, —NO$_2$, —CN, —Br, —Cl, —F, —N(alkyl)$_2$, —NH$_2$, -acyl, and —SO$_2$Z where Z is -alkyl, -aryl, —OH, or —O-metal; n is from 2 to about 300; and X is —H, -alkyl, -alkylcarboxylate, or -arylcarboxylate.

8. The method of claim 1 wherein said amine-reducible tint is selected from compounds of the formula:

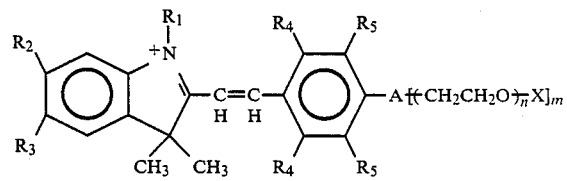

wherein $R_1$ is -alkyl; $R_2$ and $R_3$ are —H, —NO$_2$, —CN, —Cl, —Br, -alkyl, or -alkoxy; $R_4$ and $R_5$ are —H, -alkyl, -alkoxy, —Cl, —Br, or —F; n is from 2 to about 300; A is —O—, —S—, or —N—; when A is —O— or —S— then m is 1; when A is —N— then m is 2; X is —H, -alkyl, -alkylcarboxylate, or -arylcarboxylate.

9. The method of claim 1 wherein said amine-reducible tint is selected from compounds of the formula:

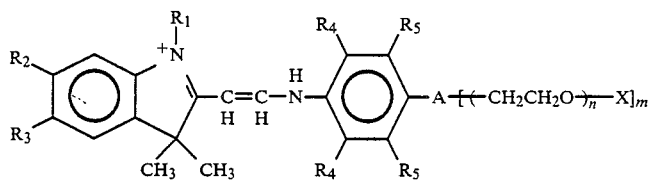

wherein $R_1$ is -alkyl; $R_2$ and $R_3$ are —H, —NO2, —CN, —Cl, —Br, -alkyl, or -alkoxy; $R_4$ and $R_5$ are —H, -alkyl, -alkoxy, —Cl, —Br, or —F; n is from 2 to about 300; A is —O—, —S—, —N—; when A is —O— or —S— then m is 1; when A is —N— then m is 2; X is —H, -alkyl, -alkylcarboxylate, or -arylcarboxylate.

10. The method of claim 1 wherein said amine-reducible tint is selected from compounds of the formula:

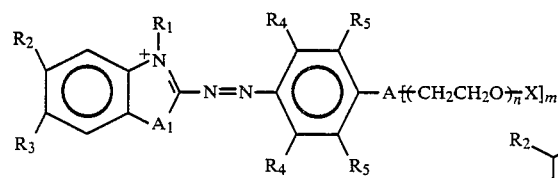

wherein $R_1$ is -alkylchlorohydrin, -alkylamide, -alkyl carboxylate, -allyl, or -alkyl; $R_2$ and $R_3$ are —H, —NO2, —CN, —Cl, —Br, -alkylsulphonyl, -acetamidyl, -sulphonamidyl, —SO3Z where Z is —H or metal ion, -alkyl, or -alkoxy; $R_4$ and $R_5$ are —H, -alkyl, -alkoxy, —Cl, —Br, or —F; n is from 2 to about 300; A is —O—, —S—, or —N—; when A is —O— or —S— then m is 1; when A is —N— then m is 2; X is —H, -alkyl, -alkylcarboxylate, or -arylcarboxylate; and $A_1$ is —O—, —S— or —NH—.

11. The method of claim 1 wherein said amine-reducible tint is selected from compounds of the formula:

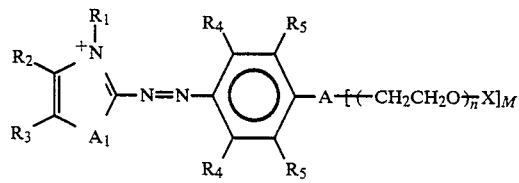

wherein $R_1$ is -alkylchlorohydrin, -alkylamide, -alkylcarboxylate, -allyl, or -alkyl; $R_2$ and $R_3$ are —H, -alkyl, —CN-alkylsulphonyl, acetamidyl, sulphonamidyl, —SO3Z is —H or metal ion, or -aryl; $R_4$ and $R_5$ are —H, -alkyl, -alkoxy, —Cl, —Br, —F, —CN or —NO2; n is from 2 to about 300; A is —O—, —S—, or —N—; when A is —O— or —S— then m is 1; when A is —N— then m is 2; X is —H, -alkyl, alkylcarboxylate, or -arylcarboxylate; and $A_1$ is —O—, —S—, or —NH—.

12. The method of claim 1 wherein said amine-reducible tint is selected from compounds of the formula:

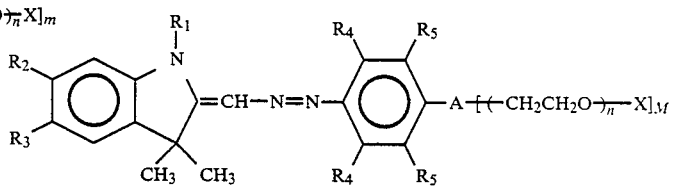

wherein $R_1$ is -alkyl; $R_2$ and $R_3$ are —H, —NO2, —CN, —Cl, —Br, -alkyl, or -alkoxy; $R_4$ and $R_5$ are —H; -alkyl, -alkoxy, —Cl, —Br, or —F; n is from 2 to about 300; A is —O—, —S—, or —N—; when A is —O— or —S— then m is 1; when A is —N— then m is 2; X is —H, -alkyl, -alkylcarboxylate, or -arylcarboxylate.

13. The method of claim 1 wherein said amine-reducible tint is selected from compounds of the formula:

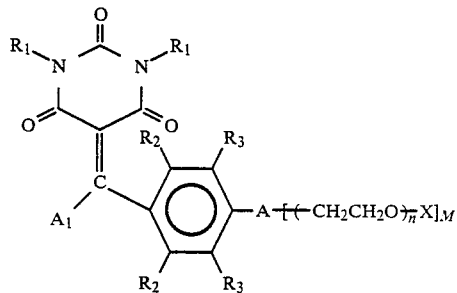

wherein $R_1$ is -alkyl; $R_2$ and $R_3$ are —H, -alkyl, -alkoxy, —Cl, —Br, or —F; n is from 2 to about 300; A is —O—, —S—, or —N—; when A is —O— or —S— then m is 1; when A is —N— then m is 2; X is —H, -alkyl, -alkylcarboxylate, or -arylcarboxylate, $A_1$ is —H or -alkyl.

* * * * *